United States Patent
Zimmer et al.

(10) Patent No.: US 9,380,873 B2
(45) Date of Patent: Jul. 5, 2016

(54) OPERATING MECHANISM FOR FURNITURE PARTS INCLUDING A SHAPE MEMORY ELEMENT

(76) Inventors: Günther Zimmer, Rheinau (DE);
Martin Zimmer, Rheinau (DE)

(*) Notice: Subject to any disclaimer, the term of this patent is extended or adjusted under 35 U.S.C. 154(b) by 766 days.

(21) Appl. No.: 12/928,364

(22) Filed: Dec. 9, 2010

(65) Prior Publication Data
US 2011/0154817 A1    Jun. 30, 2011

Related U.S. Application Data

(63) Continuation-in-part of application No. PCT/DE2009/000767, filed on Jun. 4, 2009.

(30) Foreign Application Priority Data

Jun. 10, 2008 (DE) .......... 10 2008 027 541

(51) Int. Cl.
*F03G 7/06* (2006.01)
*A47B 88/04* (2006.01)

(52) U.S. Cl.
CPC ............ *A47B 88/0477* (2013.01); *F03G 7/065* (2013.01)

(58) Field of Classification Search
CPC ........ F03G 7/06; F03G 7/065; A47B 88/0414
USPC ......... 60/527–529; 292/251.5, 167, 139, 142; 312/319.1–319.8
See application file for complete search history.

(56) References Cited

U.S. PATENT DOCUMENTS

| | | | | |
|---|---|---|---|---|
| 3,854,785 A * | 12/1974 | Manner | ............ | A47B 88/0477 292/DIG. 4 |
| 4,337,622 A * | 7/1982 | Johnson | .................... | F03G 1/10 185/40 R |
| 4,965,545 A * | 10/1990 | Johnson | ........................ | 337/140 |
| 6,851,260 B2 * | 2/2005 | Mernoe | .......................... | 60/527 |
| 7,240,978 B2 * | 7/2007 | Kobayashi | .......... | A47B 88/047 312/333 |
| 7,451,595 B2 * | 11/2008 | Komori et al. | ................... | 60/527 |
| 2005/0160858 A1 * | 7/2005 | Mernoe | ................... | F03G 7/065 74/469 |

FOREIGN PATENT DOCUMENTS

| | | | | |
|---|---|---|---|---|
| DE | 199 35 119 | | 3/2001 | |
| DE | 601 18 836 | | 9/2006 | |
| EP | 0045250 A1 * | | 2/1982 | ............. F03G 7/065 |

* cited by examiner

*Primary Examiner* — Jesse Bogue
*Assistant Examiner* — Laert Dounis
(74) *Attorney, Agent, or Firm* — Klaus J. Bach

(57) ABSTRACT

In an operating mechanism for a movable furniture part with a drive arrangement including a shape memory element, wherein the drive arrangement is fixed to one furniture part and comprises a drive element and which abuts another furniture part for moving the other furniture part, the drive element includes a shape memory element which is heatable to change its shape for operating the drive arrangement directly or for charging a spring store storing the energy for operating the drive arrangement.

10 Claims, 11 Drawing Sheets

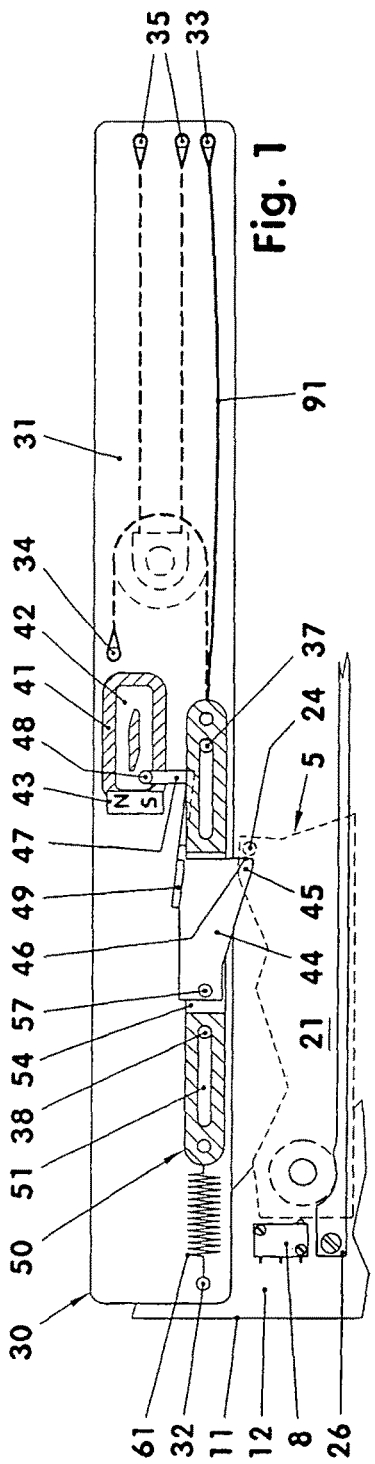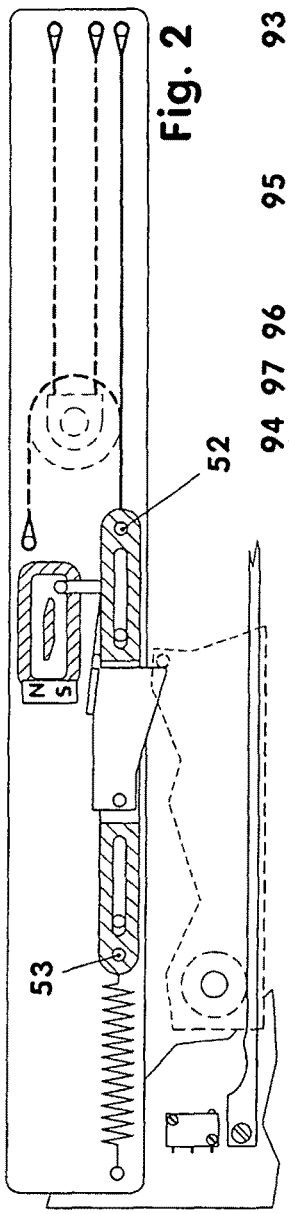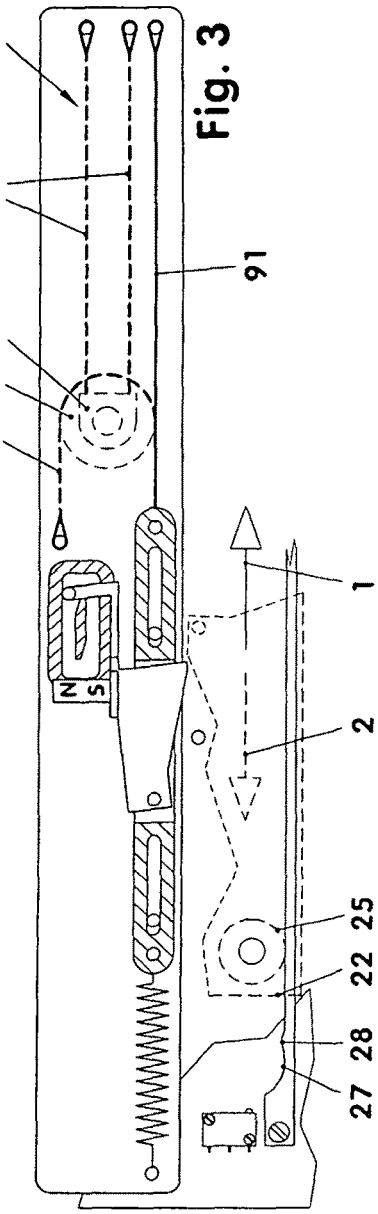

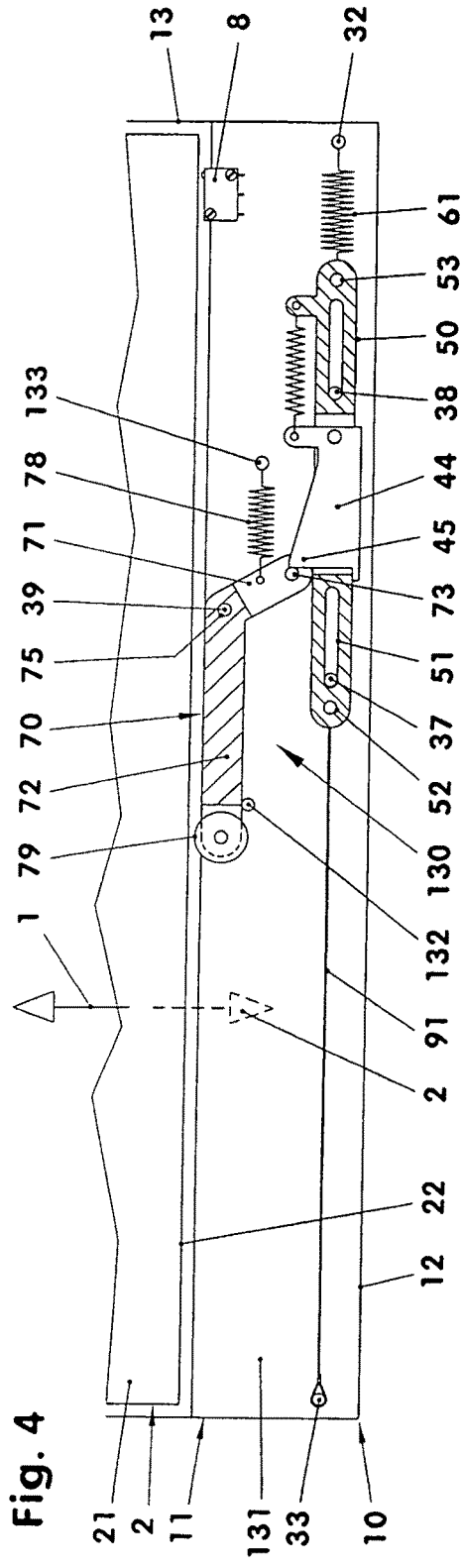
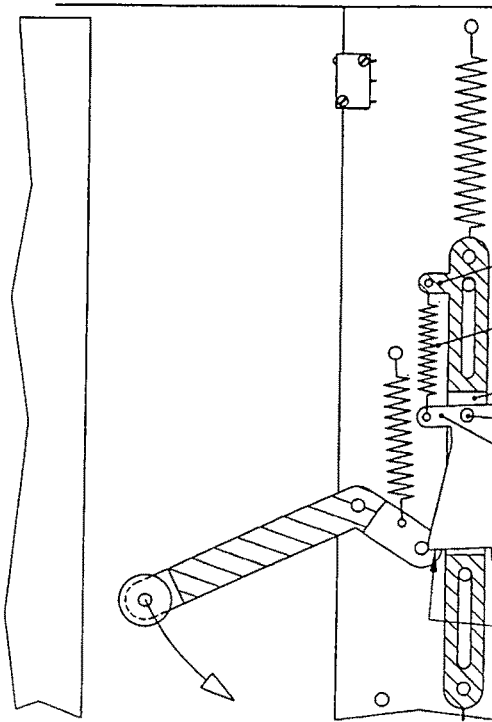
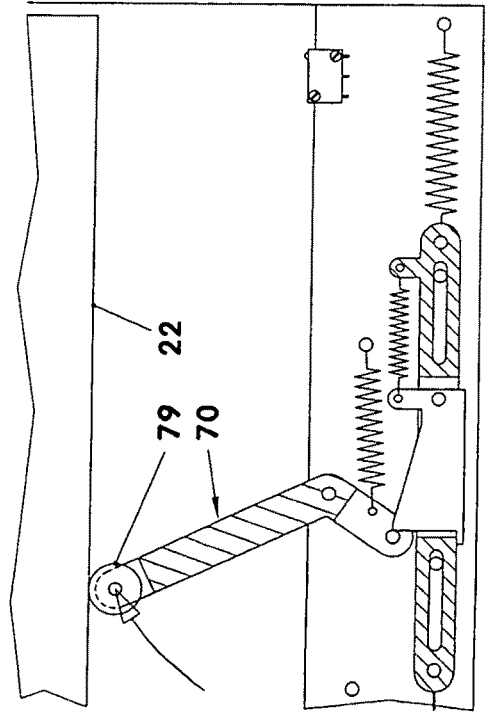

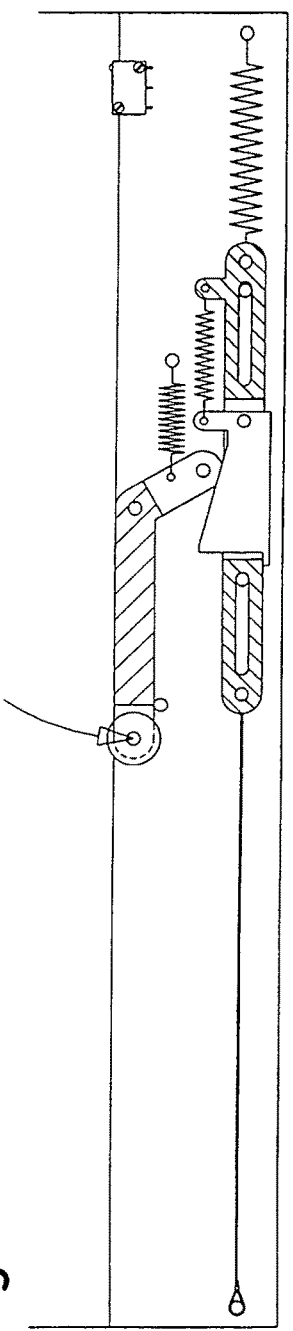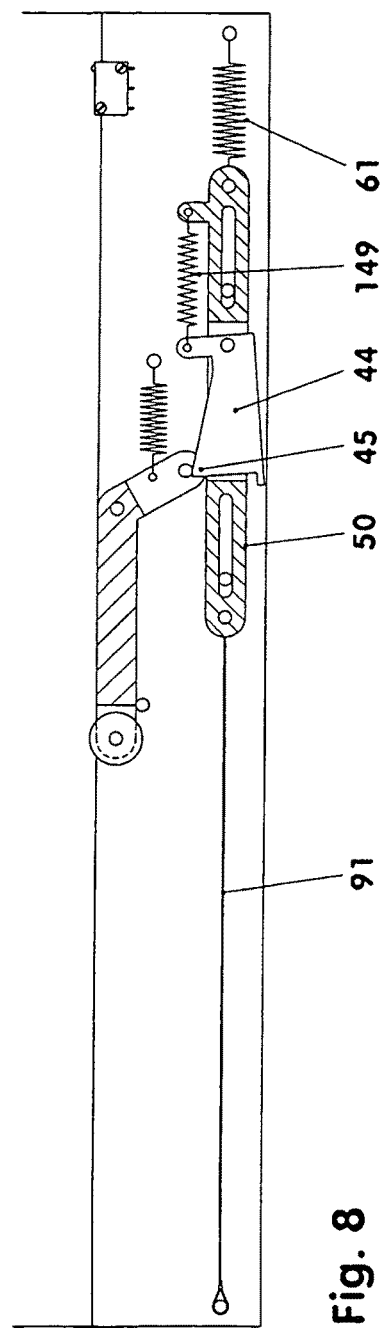
Fig. 7
Fig. 8

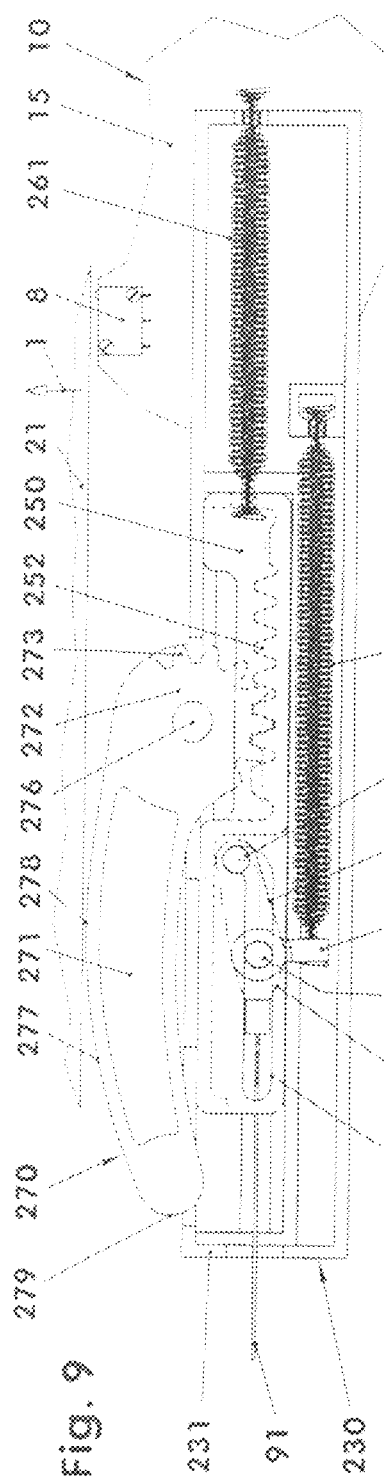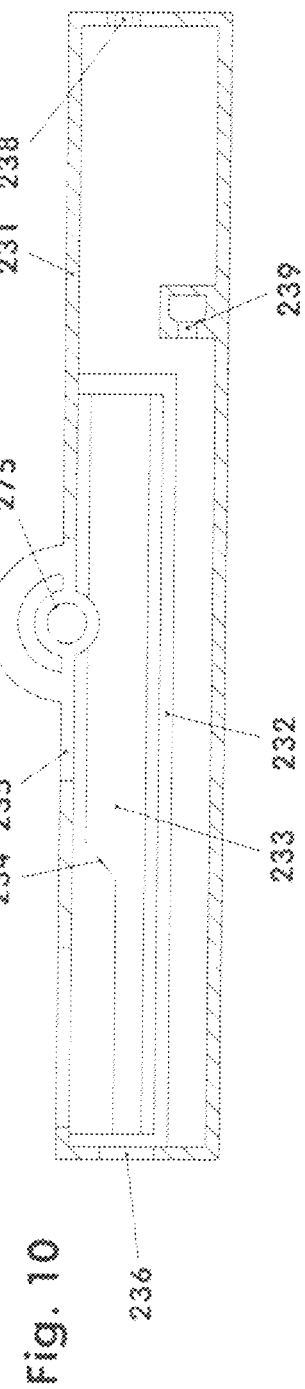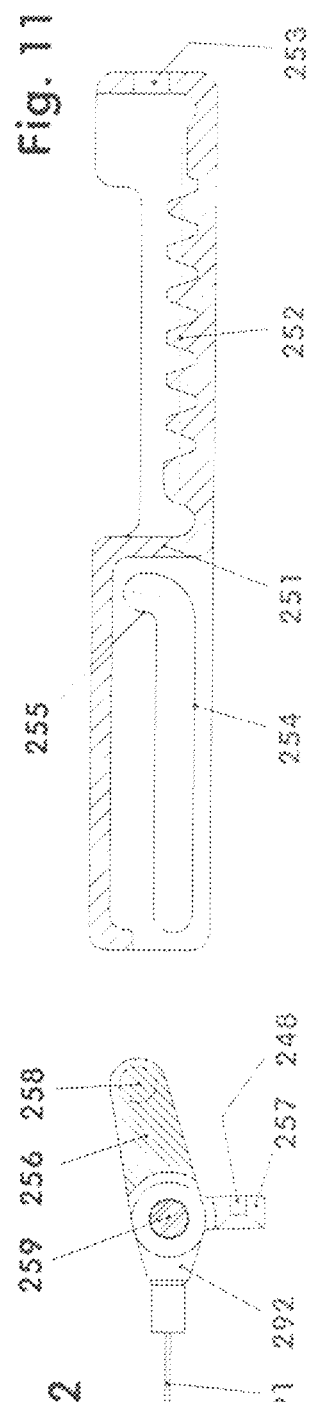

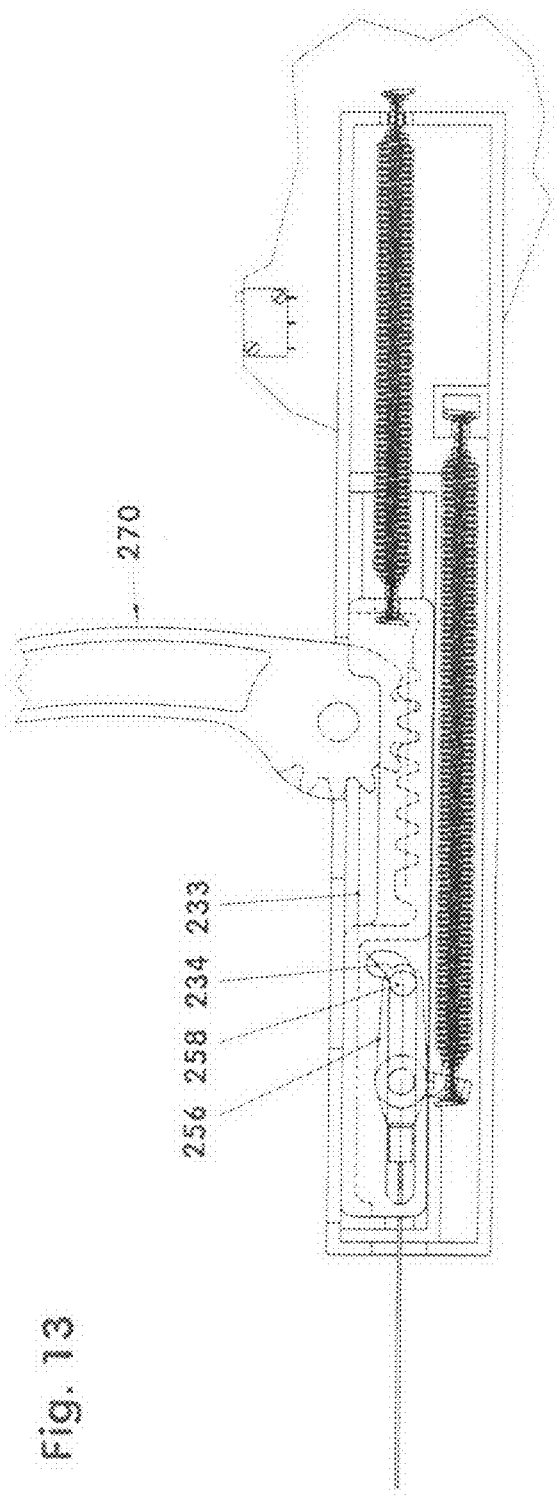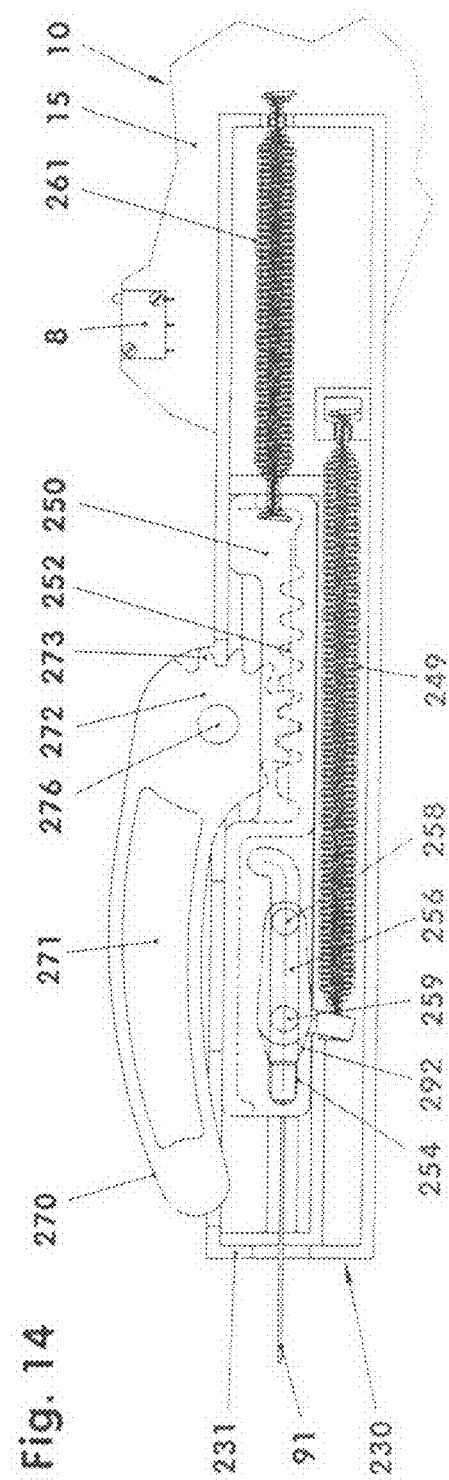

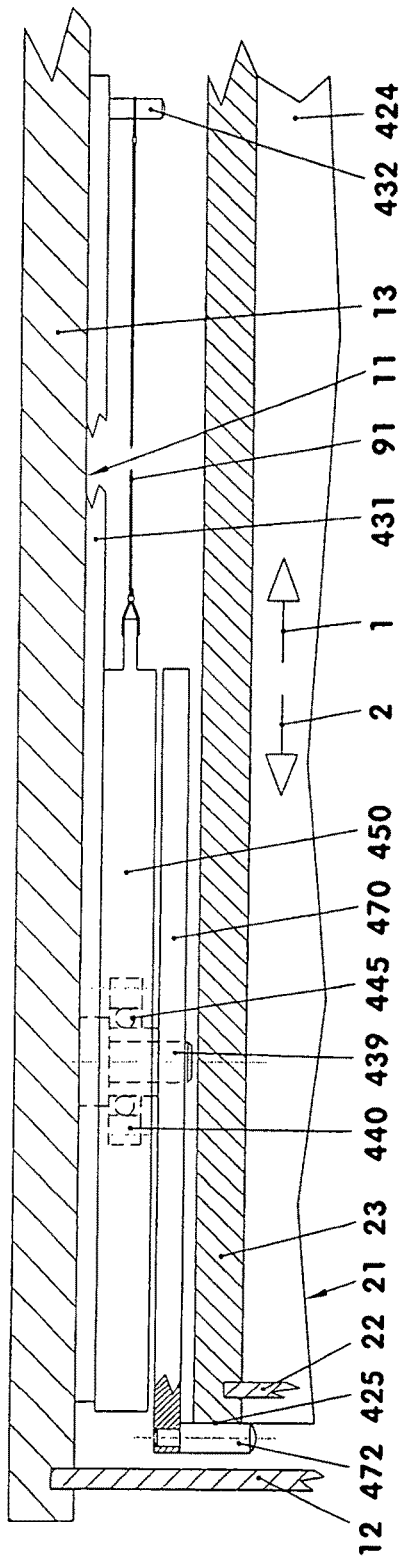
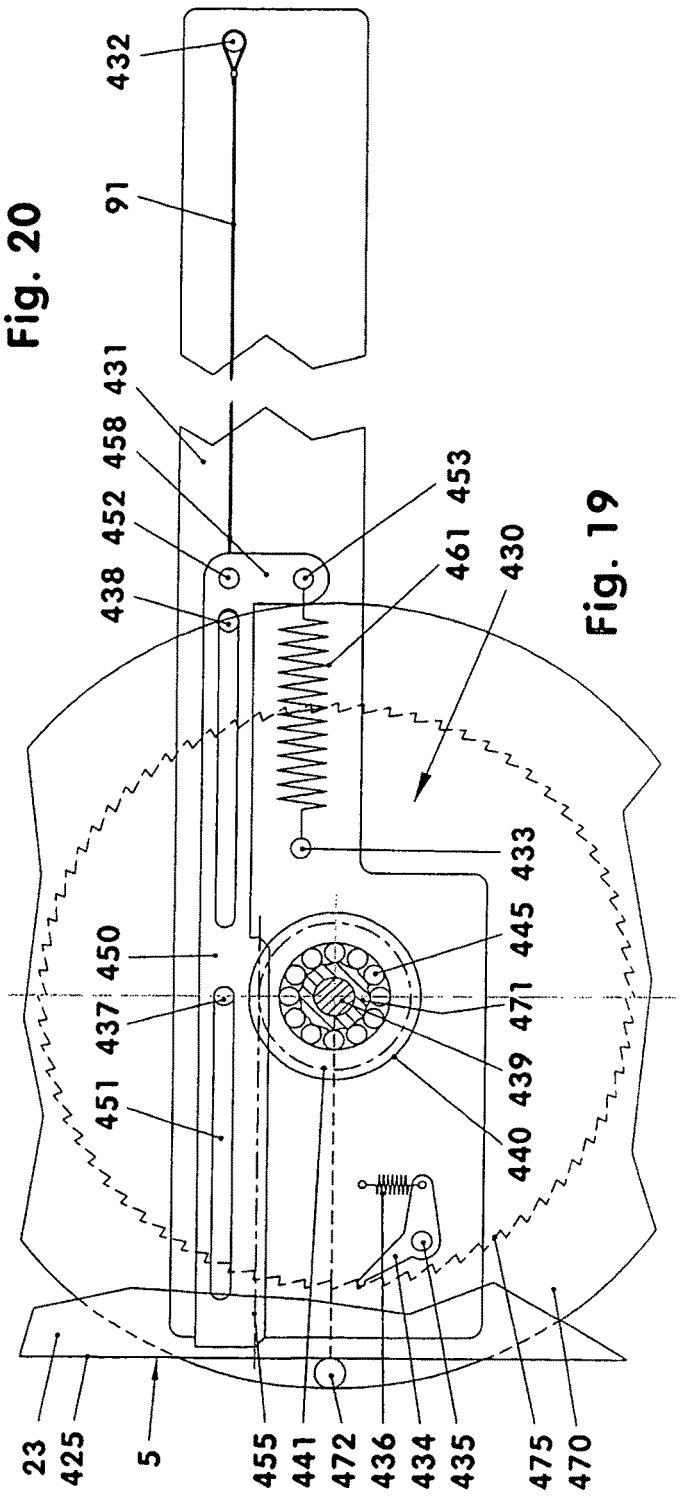

OPERATING MECHANISM FOR FURNITURE PARTS INCLUDING A SHAPE MEMORY ELEMENT

This is a Continuation-In-Part application of pending international patent application PCT/DE2009/000767 filed Apr. 6, 2009 and claiming the priority of German patent application 10 2008 027 541.7 filed Jun. 10, 2008.

BACKGROUND OF THE INVENTION

The invention resides in an operating mechanism for moving a movable furniture part with respect to a stationary furniture part by means of a drive device which includes a shape memory element in an opening or a closing direction.

DE 601 18 836 T2 discloses an operating mechanism among others for opening a sliding door, including a tape-like shape memory element. To this end, a spur gear is in engagement with a gear rack and with another spur gear. A tape-like shape memory element in the form of a tape extends in an S-loop around the two spur gears with an enveloping angle of, in each case, less than 360°. In a cold state, the tape has the described S-shape. When the tape is heated, the tape curvatures are reversed, that is, the original S-shape is mirror reversed with respect to the longitudinal axis of the S. Subsequently, the spur gears rotate about the respective enveloping angle and in this way, drive the sliding door. The process is reversible.

It is the principal object of the present invention to provide an operating mechanism for opening or closing furniture parts including at least one shape memory element for directly driving or for charging a storage device for operating a drive arrangement.

SUMMARY OF THE INVENTION

In an operating mechanism for a movable furniture part with a drive arrangement including a shape memory element, wherein the drive arrangement is fixed to one furniture part and comprises a drive element and which abuts another furniture part for moving the other furniture part, the drive element includes a shape memory element which is heatable to change its shape for, operating the drive arrangement directly or for charging a spring store storing the energy for operating the drive arrangement.

In accordance with the invention, the drive arrangement includes, in a first embodiment, a drive mechanism which executes a force-generating linear movement with the aid of one or several shape memory elements. The linear movement is transmitted directly or via a transmission to that furniture part which is movably supported on the furniture part which carries the drive arrangement.

The transmission utilized in connection with the drive arrangement may be for example a lever drive, a gear rack drive or a similar device.

For generating a linear stroke force which counteracts the operating stroke of the memory shape element, for example a spring drive, a gravity drive or a second shape memory element may be used.

In a second embodiment, a drive arrangement is provided which causes the opening movement of the movable furniture part by a spring force. To this end, for example, a spring store in the form of a mechanical spring or a gas pressure spring may be used. For recharging an expanded spring store a shape memory element is used.

The stationary furniture parts of a piece of furniture are for example the body of a cabinet, the body of a desk or also a door frame. The movable furniture parts are drawers, sliding doors, revolving or pivoting doors, flaps, extension tables or other movable parts which are moved or pivoted out of the stationary furniture part for a certain reason.

The drive arrangement is generally mounted to the stationary part. However, the drive arrangement may also be connected to the movable furniture part so as to act with respect to the stationary furniture part so as to act with respect to the stationary furniture part.

The shape memory elements which perform a linear movement and which are used for example for the opening of drawers may be arranged besides, behind, above or below the drawer. They may be arranged with their longitudinal extent disposed parallel, transverse or inclined with respect to the movement direction of the drawer. The shape memory elements may also be disposed along the body back wall over several drawers vertically or inclined with respect to the furniture body.

The invention will become, more readily apparent from the following description of several exemplary schematically shown embodiments with reference to the accompanying drawings.

BRIEF DESCRIPTION OF THE DRAWINGS

FIG. 1 shows an operating arrangement with a direct pull wire drive for a drawer in a closed position, FIG. 2 shows an arrangement like FIG. 2 but with the drawer being driven out, FIG. 3 shows an arrangement as shown in FIG. 2 but with the drawer moving out without being driven, FIG. 4 shows an arrangement with a pull wire drive acting via a lever with the drawer closed, FIG. 5 shows an arrangement as shown in FIG. 4 with the lever in an outwardly pivoted end position, FIG. 6 shows an arrangement like FIG. 5 with the lever being pivoted back, FIG. 7 shows an arrangement like FIG. 6 with the lever fully pivoted back, FIG. 8 shows an arrangement like FIG. 6 with the pull wire being extended, FIG. 9 shows an operating arrangement, with a pull wire drive acting via a lever with the drawer being in a closed position, FIG. 10 shows the housing of FIG. 9, FIG. 11 shows a slide member of FIG. 9, FIG. 12 shows the slide pawl of FIG. 9, FIG. 13 shows the arrangement of FIG. 9 with the lever pivoted outwardly, FIG. 14 shows the arrangement of FIG. 13 with the lever pivot back, FIG. 19 shows an operating arrangement with a rotatable slide-on pin, FIG. 20 is a longitudinal cross-sectional view of FIG. 19.

DESCRIPTION OF EXEMPLARY EMBODIMENT

Figure 16:
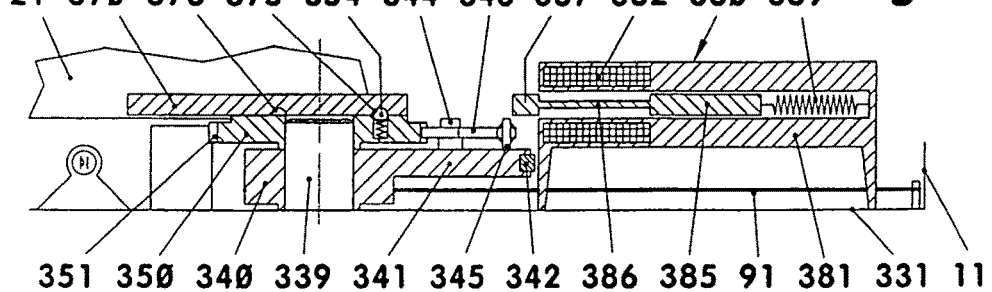
FIG. 16 is a longitudinal cross-sectional view of FIG. 15.

FIG. 1 shows an operating mechanism for electrically open a drawer 21 of a cabinet base 10, wherein a drive arrangement 30 includes as drive element for example a special pull wire 91. The pull wire 91 consists of a shape memory alloy, for example, a nickel titanium alloy. The pull wire 91 alone as a result of a temperature change switch back and forth between an expanded cold shape and a shrunken warm shape. For heating, the pull wire 91 is shortly energized via the ends thereof. The connecting wires are not shown.

The operating arrangement is disposed on a side wall 13 of a cabinet bottom part 11 as shown in FIG. 1. On this side wall also a guide track 26 is mounted which carries the drawer 21. The drawer 21 is provided with support rollers 25 which are guided in the guide track 26.

The operating mechanism is disposed on a frame structure or a plate 31. On the plate 31, several support bolts 32-35, two guide bolts 37, 38, a detent guide slot 41 and magnet 43 are mounted.

The guide bolts 37, 38 guide for example a carriage 50, which is movable for example parallel to the directions 1, 2 of movement of the drawer. To this end, the carriage 50 has two elongated openings 51 which accommodate the respective guide bolts 37, 38 with certain play. At the front end and the rear end, the carriage 50 is provided with a bore 52, 53. In the rear bore 53 for example a spiral tension spring 61 is engaged which is also linked to the support bolt 32. In the other bore 52, the pull wire 91 is mounted. Its right end is disposed on the support bolt 33 via an ear.

In the intermediate area, the carriage 50 includes a cavity 54 in which a pawl 44 is pivotally supported. The pawl 44 is pivotally supported by a pawl pivot ball 57. It has an engagement nose 45 which projects downwardly out of the cavity 54 as a result of gravity and which has a front edge 46 which is positioned in front of a carrier pin 24 of the drawer 21. In the area of the pawl 44, an arm 47 is arranged which is for example angled upwardly and which ends in a guide pin 48 extending transverse to angle arm 47. On the upper side of the pawl 44 a magnetic or magnetizable release plate 49 is arranged in the area of the angle arm pivotal support joint.

The guide pin 48 extends here into a guide slot 42 which is machined into the pawl. In the guide slot 42, the guide pin is movable along an essentially rectangular closed guide path.

As shown in FIG. 1, the drawer 21 is in its closed position. In this position, the lower support roller 25 is disposed at the lowest point of a depression 27 of the guide track 26, see FIG. 3. The depression 27 has a curvature which is greater than the radius of the support roller 25. In the opening direction ahead of the depression 27, there is a projection 28.

The spiral tension spring 61 holds the carriage 50 in its rear end position. The front edge 46 of the engagement nose 45 is disposed ahead of the carrier pin 24 of the drawer 21. The pull wire 91 is cold.

When now the drawer 21 is moved for opening a few tenths of a millimeter beyond the closed position 5, the back wall 22 of the drawer 21 or another comparable part of the drawer actuates a switch 8 which, via a subordinate circuit energies the pull wire 91. As a result, the pull wire 91 becomes shorter and the carriage 50 moving to the right pushes the drawer 21 by means of the pawl 44 over the projection 28 and accelerates the drawer 21 in opening direction 1. The drawer 21 opens and the guide pin 48 moves in the lower part of the guide channel 42 toward the right. The carriage 50 comes in the process with the release plate 49 into range of the magnet 43 which may also be an electromagnet.

As soon as and upon outward movement of the drawer 21, the carrier pin 24 is released from the engagement projection 45—the contraction of the pull wire is terminated—the magnet 43 attracts the release plate 49. The pawl 44 is then pivoted upwardly about the pawl pivot bolt 57. The guide pin 48 in this way reaches the upper area of the guide channel 42. The engagement projection 45 has now been raised to such an extent that the carrier pin 24 and the drawer 21 can move out below the engagement projection 45 without coming into contact therewith.

In the meantime, the taut wire 91 begins to cool down and the spiral tension spring 61 pulls the carriage to the left into it initial position as the taut wire 91 becomes longer. The guide pin 48 moves along the upper path of the guide channel 42. This occurs also when the release plat 49 has been released from the magnet 43. The rear end of the guide path is reached as soon as the carriage 50 has again assumed its rear end position—see FIG. 1. The taut wire then extends untensioned between the bore 52 and the support bolt 33. The guide pin 48 now falls back to the lower guide groove 42 whereby also the engagement nose 45 is again disposed behind the carrier pin 24. The drive arrangement 30 is now again in its start out position.

As soon as also the drawer has returned to its closed position, the operating mechanism can again be activated.

In FIGS. 1 to 3, pull wires 93 are marked by dashed lines to indicate that instead of a single pull wire 91 a bundle of pull wires 93 may be employed. In the shown embodiment, a reversing structure 96 is provided so as to be longitudinally guided on the plate 31 and is connected via two pull wires 95 to the plate 31 by support bolts 35. The reversing structure includes a reversing roller 97 by which a pull wire 94 connected at one end to the carriage 50 is reversed. The other end of the pull wire 94 is mounted by a support bolt 34. In this case, all wires 94, 95 are energized for opening the drawer 21. Using comparable wire cascades, the carriage travel distance and/or the pulling force can be changed.

FIGS. 4 to 8 show a body 11 and a drawer 21 in a top view. As shown in FIG. 4, the drawer 21 is in its closed position 5. Between the back wall 22 of the drawer 21 and the back wall 12 of the body 11, a plate 131 is arranged on which the operating mechanism with is drive arrangement 130 is mounted.

Also in this drive arrangement 130 a carriage 50 with a pawl 44 is used. The carriage 50 includes two elongated openings 51 via which it is guided by the guide bolts 37, 38. In front of the carriage 50, the pull wire 91 is arranged. It is hooked into a bore 52 of the carriage 50 and fixed to the body by a support bolt 33.

In this state as shown in FIG. 4, the carriage 50 is moved to its rear position by a tension spring 61 with a low spring rate of for example less than 1 N/mm. The pull wire is in this case not tensioned.

The carriage 50 is provided with a recess 54 (see FIG. 6) in which the pawl 44 is pivotally supported by a pawl pivot bolt 57. The pawl 44 has an engagement projection 45, a pivot lever 147 and a stop 148. At the pivot lever 147 of the pawl 44, one end of a tension spring 149 is attached whose other end is attached to a support arm 58 of the carriage 50. The tension spring 149 holds the pawl generally in a position as shown in FIGS. 4 and 5. In this position, the stop 148 of the pawl 44 abuts the carriage 50.

In the opening direction 1 in front of the carriage 50, for example, a 45° bent knee lever 70 is arranged. It includes a short lever arm 71 and a long lever arm 72. Both lever arms extend from a pivot bearing 75. The short lever arm 71 carries at its free end an engagement bolt 73 whereas the long lever arm 72 supports at its free end a lever roller 79. The knee lever 70 is supported via its pivot bearing 75 by a pivot stud 39 mounted to the housing plate 131. A tension spring 78 extends between the short lever arm 71 and a stationary support bolt 133. The tension spring 78 pulls the knee lever 70 toward a stationary stop bolt 132.

For example to the right of the knee lever 70, which is a push-open lever, a switch 8 is arranged on the plate 131. The switch 8 has an operating member projecting toward the back wall 22 of the drawer. The operating member and the lever roller 79 are not in contact with the back wall 22 as long as the drawer is resting in its closed position 2.

For opening the drawer 121, the drawer is pushed toward the switch by a few tenths of a millimeter whereby the switch 8 is activated and, via an electric circuit energizes the pull wire 91 so as to heat it. The pull wire becomes shorter in the process and pulls the carriage 50 so that the front edge 46 of the pawl 44 abuts the engagement bolt 73 and pivots the knee lever against the rear wall 22 of the drawer 21. The lever roller 79 rolls along the rear wall, see FIG. 5, and pushes the drawer out of its closed position.

As soon as, upon pivoting of the drawer opening knee lever 70, the upper front edge 46 of the pawl 44 moves under the center area of the engagement bolt 73, the pawl 44 is pivoted downwardly, see FIG. 6, and facilitates back-pivoting of the knee lever 70, see FIG. 7. In the mean time, the drawer 21 continues to move to its open position by its inertia.

During the cooling period of the pull wire 91 in which the pull wire becomes longer, the tension spring 61 pulls the carriage 50 to the right back into its original position, see FIG. 8. In the process, the pawl 44 resiliently pivots downwardly to pass below the engagement bolt 73 of the knee lever 70. As soon as the engagement projection 45 has moved past the engagement bolt 73 the pawl pivots upwardly, clockwise, under the force of the tension spring 149 until the engagement projection 45 is again behind the engagement bolt 73. When the drawer 21 is pushed again back into its closed position, the operating mechanism is again in its initial position.

FIGS. 9 to 14 shows an operating mechanism wherein the drive arrangement 230 moves a carriage 250 which includes for example a toothed rack 252, which for opening a drawer 21 is supported in a cabinet base 10 and adapted to pivot an at least partially toothed opening lever 270 via the toothed rack 252.

To this end, the furniture base includes in the area behind the drawer 21 a support frame 15 on which for example a parallelepiped housing 231 is arranged—see FIG. 10.

The housing 231 has in the intermediate area on the side of the guide frame 232 a support bearing location 275 in the form of a bore for accommodating the pivot stub 276 of the opening lever 270. In the area of the bearing location 275, the housing 231 includes an opening 235 for accommodating the opening lever 270. To the right, the housing has two engagement locations 238, 239 for accommodating tension springs 261, 249, see FIG. 10. In the left end wall of the housing 231, there is an opening 236 through which a pull wire 91 extends.

The housing 231 has in the intermediate area on the side of the guide frame 232 a support bearing location 275 in the form of a bore for accommodating the pivot stub 276 of the opening lever 270. In the area of the bearing location 275, the housing 231 includes an opening 235 for accommodating the opening lever 270. To the right, the housing has two engagement locations 238, 238 for accommodating tension springs 261, 249, see FIG. 10. In the left end wall of the housing 231, there is an opening 236 through which a pull wire 91 extends.

The housing 231, which is shown open in FIGS. 9. 10, 13 and 14, is closed in operation by a cover which is mirror-reversed with respect to the housing bottom, and also has a guide frame 232 and a recess 233.

The carriage 250, which is arranged in the guide frame 232 so as to be movable longitudinally is shown in FIG. 11 in a cross-sectional view taken along the center of the carriage. The carriage 250 comprises essentially an upper and a lower plate which are interconnected by an S-shaped web 251. The web divides the carriage 250 into a left and a right section. The longitudinal side wall of the right section forms a toothed rack 252. The right end wall of this section has an opening 253 forming a support structure.

In the left section, the upper and the lower plate include each an L-shaped elongated guide opening 254 whose straight center section extends along an extension of the rolling path of the tooth rack 252. The short section of the elongated opening 254 is at least so long that its left engagement flank 255 has at least a several tenths of a millimeter long straight section.

FIG. 12 shows in a horizontal sectional view a slide pawl 256 supported and guided in the carriage 250 in the elongated guide opening 254 together with a pull splice strap 292. The slide pawl 256 has a pawl arm 257 which extends sidewardly at an angle of for example 100° which has at its free end an engagement structure 248 for a tension spring 249. In the area of the bend between the slide pawl 256 and pawl arm 257 there is a slot through which a guide pin 259 extends and in which a pull splice strap 292 fixing the pull wire 91 is disposed.

The pull splice strap is held by the guide pin 259. The guide pin 259 projects upwardly and downwardly from the slide pawl 256 to such an extent that it is safely guided in the two elongated guide openings 254 of the housing 231. At the front end of the slide pawl 256, there is a guide pin 258, which extends parallel to the guide pin 259 and through the elongated guide openings 254 into the recesses 233 of the housing 231.

The opening lever 270 has an essentially disc-like hub 272 and a sickle-shaped curved long arm 271. The hub 272 has arranged opposite the arm 271 a gear section 273 including for example six teeth which are disposed over for example an area of 180° and which project from the hub 272. In the center of the hub, there is the pivot stud 276 of the opening lever 270. The curved arm 271 has a curved contact surface 277 disposed opposite the rear wall 22 of the drawer which curved wall corresponds for example to a cylinder wall section see FIG. 9. This contact surface 277 is in contact during opening of the drawer—first with the drawer along a first contact line 278. In this way the opening lever 270 contacts the drawer 21 at the imitation of the opening movement with a lever arm which is shortened for example by ½. Shortly before the drawer 21 leaves the opening lever 270, it is in contact with the lever via the last contact line 279. The opening lever 270 is then effective with its maximum arm length.

If the contact surface 277 is curved also in a direction transverse to the curvature shown in FIG. 9, that is, if the contact surface is spherical, the contact lines 278, 729 become contact points.

For opening the drawer 21, it is pushed with its back wall 22 against the switch 8 whereby the pull wire 91 is energized and heated. It pulls then via the pull splice strap 292 the slide pawl 256, see FIG. 9. The slide pawl 256 is at this point in its right end position in the elongated guide opening 254 of the carriage 250 disposed in the guide frame 232. In this position, it is retained by the tension spring 249.

As the pull wire 91 becomes shorter, it pulls the combination of slide pawl 256 and carriage 250 toward the left. In the process, the gear rack 252 of the carriage 250 rotates the hub 272 with the gear section 273 of the opening lever 270 which is pivotally supported in the support bearing 275. The opening lever 270 as a result pivots in clockwise direction against the leak wall 22 and, accordingly, moves the drawer 21 in the opening direction 1.

Shortly before the opening lever 270 reaches the end position as shown in FIG. 13 the control pin 258 contacts the inclined ramp 234 of the recess 233. As a result, the control pin 258 is moved by the engagement flank 255. The engagement flank 256 then pivots about the guide pin in a clockwise direction by for example 13.5° C. The pivot pin 258 now reaches the area of the elongated opening track 254 which is oriented parallel to the direction of movement of the carriage 250. As a result, the control pin 258 uncouples the carriage 250 from the pull wire 91.

Now, the carriage 250 is pulled by the tension spring 261 toward the right whereby the opening pawl 276 is pivoted back, see FIG. 14. The slide pawl 256 is not moved in the process.

During the subsequent phase of elongation of the pull wire 91, the tension spring 249 connected to the pawl arm 257 displaces the slide pawl 256 toward the right. As soon as the pull wire 91 is cooled down the control pin 258 is again disposed in front of the engagement flank 255 in order to couple the carriage 250' to the pull wire 91, see FIG. 9.

Upon closing of the drawer 21, the operating mechanism is then again in its initial position.

Figure 15:
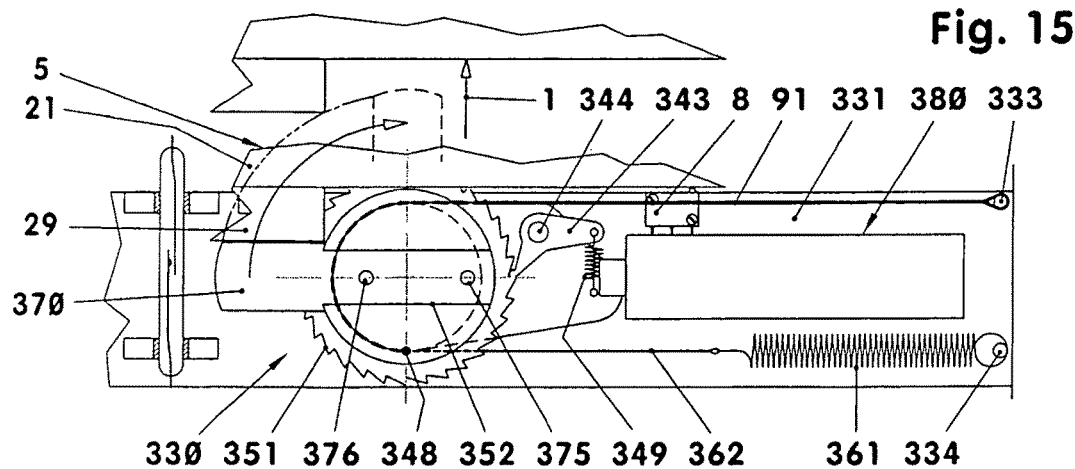
FIG. 15 shows an operating arrangement with a pull wire drive and several throw-out levers.
Figure 17:
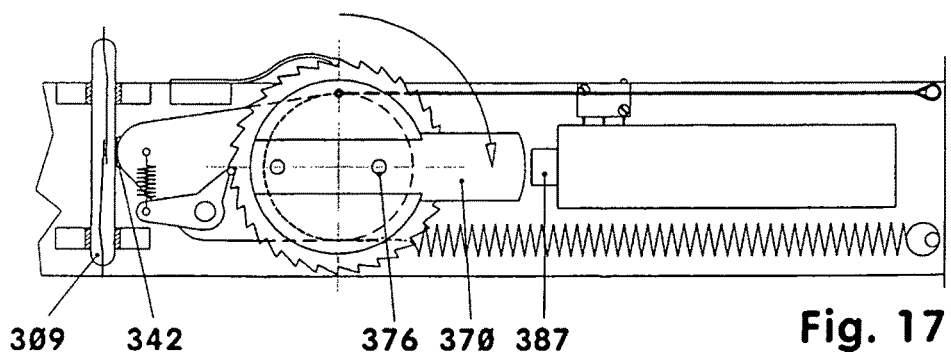
FIG. 17 shows the arrangement of FIG. 15 with the drawer being no longer driven.
Figure 18:
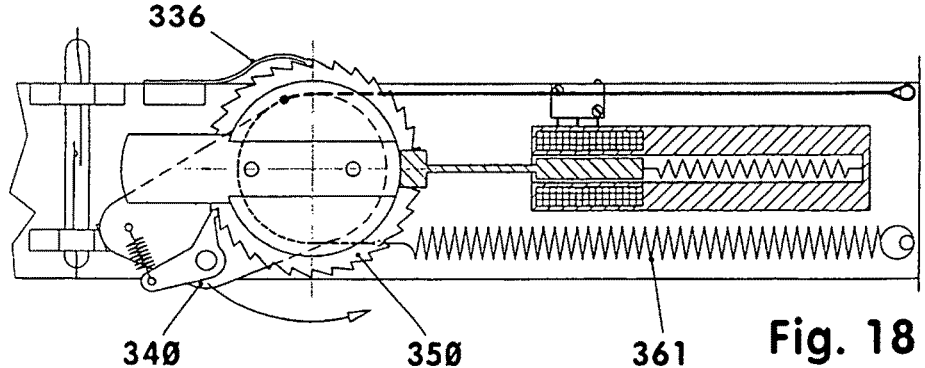
FIG. 18 shows the arrangement of FIG. 17 during return of the draw-out lever.

FIGS. 15, 17, and 18 show in a top view a part of a drawer 21 and an operating mechanism arranged therebehind. The latter has a drive arrangement 330 which includes a rope pulley 340 around which a pull wire 91 and a spring-tensioned return wire 362 extends at least partially. The rope pulley 340 carries on a circular toothless support disc 350 an opening lever 370 which is supported on the support disc 350 so as to be longitudinally extendable or displaceable. FIGS. 15 and 16 show the drive arrangement 330 in its initial position mounted on a cabinet base 11. The drawer which includes a release projection 29 is in the closed position.

The main component of the drive arrangement 330 is the rope pulley 340 around which a pull wire 91 and a return wire 362 extend for example around half the circumference. The rope pulley 340 is for example supported by a pivot bearing 339 which is mounted to a frame 331. Above the pull wire 91 a stopper plate 341 is arranged on the rope pulley 340. The stopper plate 341 projects at one side over the rope pulley 340. At the largest diameter of its radial contour, it carries a permanent magnet 342. On the stopper plate 341, an angled ratchet 343 is supported on a pivot bolt 344. The ratchet 343 is part of a directional tooth stopper ratchet and engages into the teething 351 of the support disc 350 which is also supported by the pivot bearing mounting stub. It prevents rotation of the support disc 350 in a counterclockwise direction. To this end, it is held by a tension spring 349 which extends between the ratchet 343 and a bolt 345 mounted on the stopper plate 341, in engagement with the direction toothing.

The support disc 350 is provided above the directional toothing 351 with a dovetail guide structure 352 in which the closing lever 370 is guided. The latter is held in accordance with FIGS. 15 and 16 in a front position wherein it extends at least essentially parallel to the engagement surface of the release projection 29 of the drawer 21 when abutting the engagement surface. In this position—opposite the support disc 350, it is held by means of a locking structure. To this end, an engagement ball 354 which is disposed spring loaded in a dead end bore is biased into engagement with a first of two lever cavities 375, 376 of the closing lever 370.

Next to the rope pulley 340 a lifting magnet 380 is arranged on the frame 331 as a linear drive. In the housing of the stepping magnet 380, a coil 382 is installed which, upon energization, acts on a core 385 guided in the central bore of the stepping magnet 380. The core 385 includes a plunger 386 extending from the magnet housing 381 and having a front end which carries for example a non-metallic plunger hammer 387. A tension spring 389 which is disposed behind the core 285 hold the core 385 in a rear position when the coil 382 is not energized. Then the plunger 387 abuts the front side of the housing of the lifting magnet 380.

In order to open the drawer, the drawer is shortly pushed inwardly against the switch 8. As a result, the pull wire 91 is energized by a circuit. As a result, the pull wire 91 is shortened and, since it is fastened to the frame 331 by a support bolt 333 and to the rope pulley 340 at the mounting point 348, it pivots the rope pulley 340 together with the engagement disc 350 and the opening lever 370, in the exemplary embodiment by 180° in clockwise direction. In this .rotational direction, the rope pulley 340 is coupled with the engagement disc 350 by way of Lhe stopper 343. with the pivot movement of the rope pulley 340 the return wire 362 is wound onto thereon over an area of 180°. The front end of the return wire 362 is also fixed at the mounting location 348. At the opposite end, a tension spring 361 is connected which is connected at the opposite end thereof to a support bolt 334 of the frame structure 331. During the heating based pulling phase of the pull wire 91, the return spring 361 is tensioned see FIG. 17.

In place of the spiral tension spring also a torsion spring may be used, for example a spiral tension spring which is disposed on a pivot pin 339 and engaged by a frame member 331, may be used.

With the pivot movement of the engagement disc 350, the opening lever 370 is biased against the release projection disposed on the backside of the drawer. The opening lever 370 slides with its free end along the backside 22 of the drawer over about 75 angular degrees of its pivot path so as to accelerate the drawer 21 in opening direction 1. Then the opening lever 370 detaches from the drawer 21. The opening lever 370 may be provided at its free end with a lever roller, see lever roller 79 of FIG. 4.

When the pull wire 91 has assumed its short length the opening lever 370 is pivoted by 180°, see FIG. 17. The free end of the opening lever 370 is then disposed at a small distance from the plunger hammer 387 of the stepping magnet 380. At the same time, the permanent magnet 342 of the stopper plate 341 is pivoted in front of a reed switch 309 mounted onto the housing 331. The reed switch 309 actuates the stepping magnet 380 by way of an electric circuit for a short period. The latter moves the opening lever 370 to its second end position, see FIG. 18, and then moves back it to its initial position. In this end position, the engagement ball 354 is seated in the second lever cavity 376 and in this way, holds the opening lever 370 in its position on the engagement disc 350.

In the meantime, the pull wire 91 becomes longer as it cools down. As a result, the rope pulley 340 is pivoted back in a counter clockwise direction, to its initial position, see FIG. 18. The engagement disc 350 however does not change its position since it is prevented from rotating back by a second stopper 336, for example a leaf spring stopper 336 mounted on the frame 331.

When the rope pulley 340 and the drawer 21 have again assumed their original position, this operating mechanism is again in the start out position for a new drawer opening movement.

FIGS. 19 to 23 show an operating mechanism whose drive arrangement 430 drives the drawer 21 via a rotatable disc 470 disposed below the drawer.

The drive arrangement is set up on a plate 431, which is arranged at the side wall 13 of the cabinet body 11 near the back panel 12, see FIG. 20. It is disposed for example above the guide track supporting the drawer 21. The drive arrangement 430 may be integrated with the guide track. On the plate 431, a carriage 450 is movably disposed guided by guide bolts 437 and 438 via elongated openings 451 in which the guide bolts are accommodated. The carriage 450 has a bracket 458 at whose free end a return spring 461 is mounted. The other end of this tension spring is attached to a plate-side support bolt 433. The return spring 461 acts on a pull wire 91. The latter is suspended in a bore 452 of the carriage 450 and is fixed to the plate 431 by a retaining bolt 432. In the position as shown in FIG. 19 the de-energized pull wire is not necessarily tensioned since the carriage 450 abuts the right end of the left elongated opening 451 under the effect of the return spring 461.

In the carriage 450, a gear rack is integrated whose teeth are in engagement with the teeth 441 of a gear wheel 440. The gear wheel 440 has a central bore in which a freewheeling structure 445 is arranged. The hub of the freewheeling structure 445 is at the same time the hub 47 of a rotatable disc 470. The rotatable disc 470 is supported by a pivot shaft 439 mounted onto the plate 431.

The rotatable disc 470 carries on its outer end area a contact pin 472 which abuts the rear edge of the drawer wall 23. The rotatable disc 470 may also be a lever at whose free end the contact pin 472 is mounted.

At the side wall opposite the side wall 23, the rotatable disc 470 is provided with a directional gear structure 475 which is engaged by an angled latch member 434 which is pivotally supported by a latch bearing 435 and spring-biased into contact with the directional gear structure. The directional gear structure 475 prevents rotation of the rotatable disc in counter clockwise direction.

In order to open the drawer 21, that is, move it in the opening direction 1 the pull wire (91) is energized for example by a remote transmitter, a receiver and an electric circuit for a short time. The pull wire 91, as a result, is shortened and pulls the carriage 450 to the right against the force of the return spring 461. In the process, the gear wheel 440 is rotated in a clockwise direction. In this direction, the freewheeling structure 445 locks up and rotates in this way also the disc hub 471 and synchronously also the rotatable disc 470. As a result, the contact pin 472 slides along the drawer edge whereby the drawer—beginning with a minimal lever arm—is moved, see arrow 403, FIG. 21.

Figure 21:
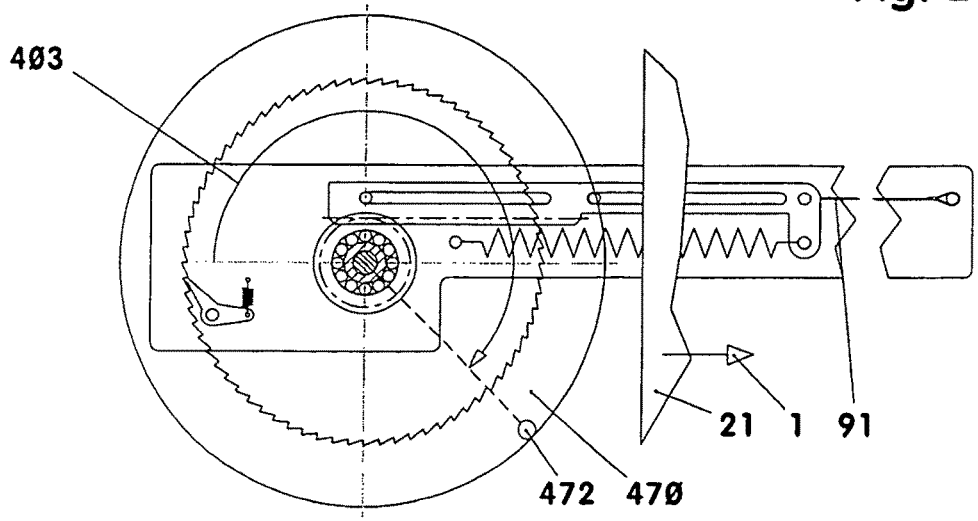
FIG. 21 shows an arrangement like FIG. 19 with a shortened pull wire.
Figure 22:
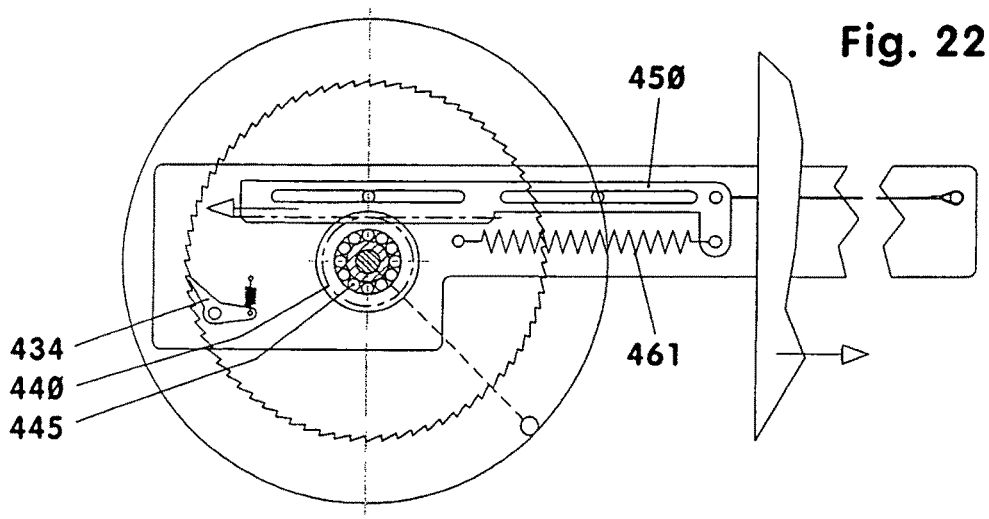
FIG. 22 shows the arrangement of FIG. 21 with the slide carriage being moved back.

When the shortening of the pull wire 91 is completed, see FIG. 21, the rotatable disc 470 has reached a pivot angle of about 225°. For up to 180° of the pivot range, the contact pin 472 has been in contact with the drawer edge 425.

While the drawer 21 continues to open up because of its mass inertia, the cooling pull wire 91 becomes again longer. The return spring 461 moves the carriage 450 toward the left into its original position, see FIG. 22. The backward rotating gear wheel 440 cannot drive the rotating disc 470 since the freewheeling structure 445 is open in counterclockwise direction and additionally the latch member 434 blocks movement in counterclockwise direction.

Figure 23:
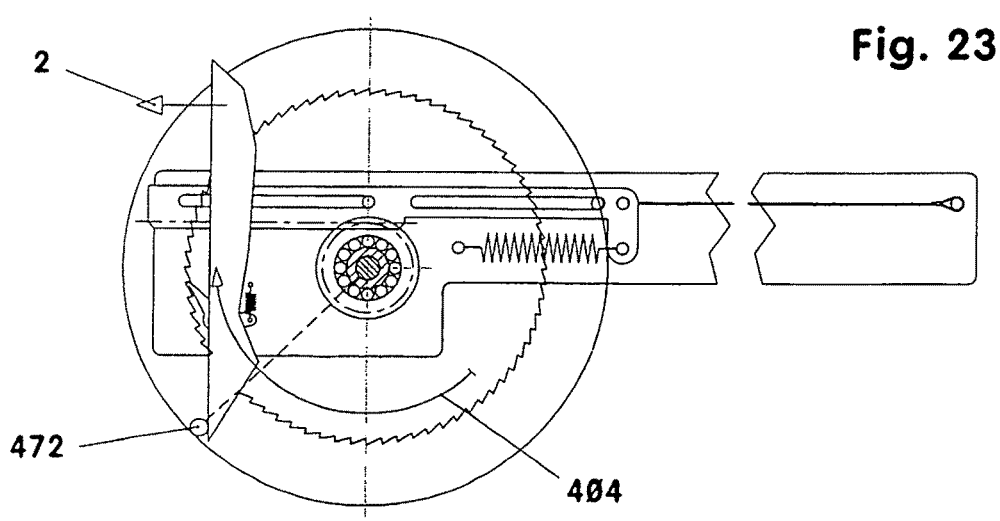
FIG. 23 shows the arrangement of FIG. 17 with the drawer closing.

The rotatable disc 470 is only again in the original position as shown in FIG. 19 when the drawer 21 is closed, see FIG. 23. The drawer 21, when being closed, moves with the edge 425 thereof the contact pin 472 and as a result pivots the rotatable disc 470 in clockwise direction. The latch member 434 is ineffective herein.

When the drawer 21 and the carriage 450 have reached the closed position 5, the opening procedure may begin anew.

Figure 24:
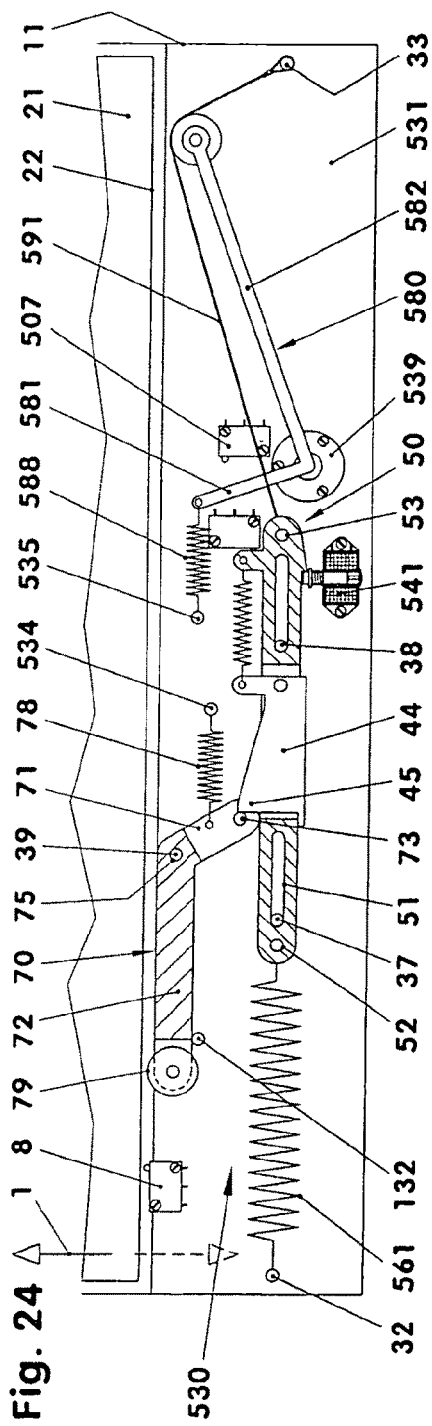
FIG. 24 shows the operating mechanism with a spring drive for opening a drawer.
Figure 25:
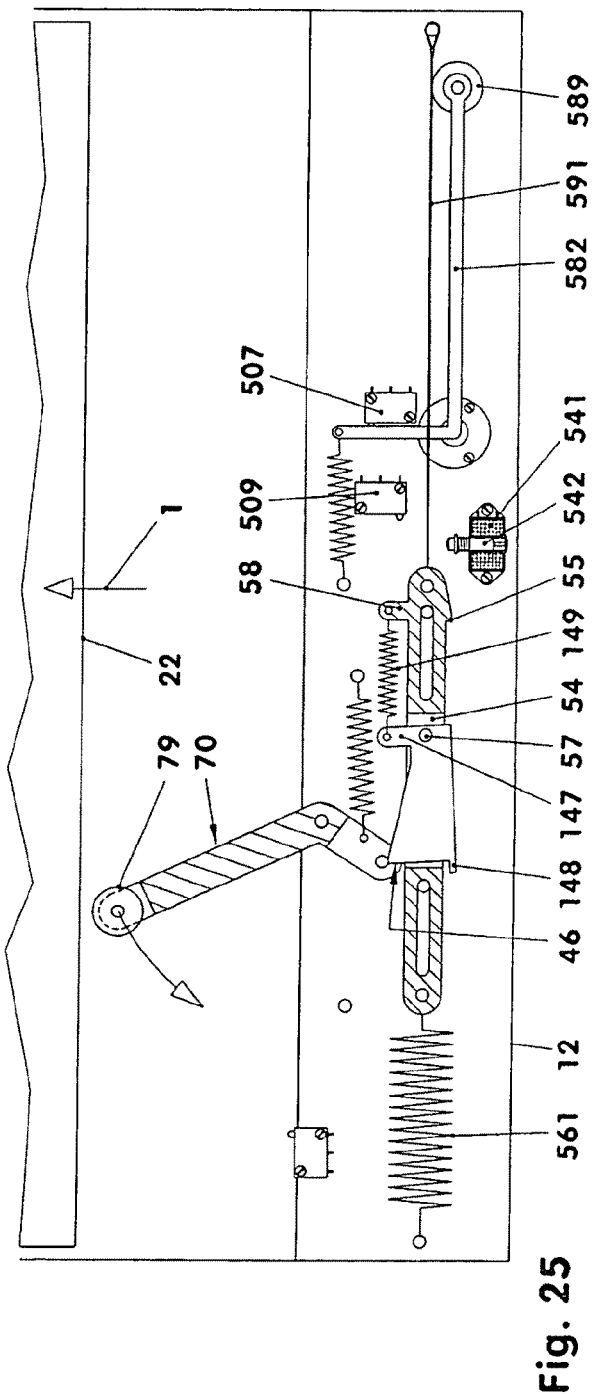
FIG. 25 shows the arrangement of FIG. 2 during tensioning of the drive spring.

FIGS. 24 and 25 show another variant wherein the drawer 21 is opened by an opening lever 70 by means of a tensioned spring element 561. The opening lever 70 is driven by a carriage 50 on which the spring element 561 acts. For tensioning the spring element 561 which is relaxed after the opening of the drawer 21 a pull wire 591 consisting of a shape memory material is used.

The spring element 561 is in the shown example a spiral tension spring, however, it may also be a compression spring, a leaf spring, a torsion spring, an elastomer spring, a gas spring or similar. Also a combination of several springs of the same or of different types of springs is possible. Instead of a spring element also a gravity element effective on the carriage 50 may be used.

In FIG. 24, all movable parts are in the initial position. The drawer 21 is disposed with its rear wall 22 directly in front of the opening lever 70 and the spring energy storage device that is the tension spring 561 is tensioned. The pull wire 591 has assumed its greatest length.

The drive arrangement 530 is mounted onto a mounting plate 531. The carriage 50 is supported via its elongated openings 51 by the guide bolts 37, 38 which are mounted on the mounting plate 531. The carriage 50 carries in a cavity 54 a pawl 44 which is supported pivotally about a pawl pivot bolt 57. The pawl 44 has a pivot lever 147 at whose free end a tension spring 149 is attached. The tension spring 149 is supported by a support arm 58 of the carriage 50.

Between the carriage 50 and the rear drawer wall 22, there is an opening lever 70 supported on the pivot stud 39. The opening lever 70 carries on a long lever arm 72 a lever roller 79 and, on a short lever arm 71, an engagement bolt 73. The latter abuts in accordance with FIG. 24 the engagement projection 45 of the pawl 44.

The carriage 50 has for example in its rear area an engagement projection 55 whose rear flank is inclined toward the movement direction of the carriage 50 by about 50°. The engagement projection 55 is oriented toward the back wall 12' of the closet body 11. In accordance with FIG. 24, an electrically operated stepping magnet 541 is arranged between the carriage 50 and the rear wall 12. The stepping magnet has an engagement bolt 542 which is fully extended toward the carriage 50 by spring force when the stepping magnet is de-energized. In accordance with FIG. 24, the engagement bolt 542 holds the carriage 50 by means of the engagement projection 55 in the rear position.

In front of the carriage 50, there is the spiral tension spring 561 which is fixed to a support bolt 32 mounted on the plate 531. The tension spring 561 is attached to the carriage 50 at the front bore 52. The carriage 50 abuts the engagement bolt 542.

The pull wire 591 is mounted at the rear bore 53 of the carriage 50. At its other end, the pull wire 591 is provided with an ear engaged by a support bolt 33 of the plate 531. The pull wire 591 is tensioned by a tensioning lever 580. The tensioning lever 580 is supported on the plate 531 via a pivot bearing 539. It has a long tensioning arm 582 which is provided at its free end with a tensioning lever roller 589 abutting the pull wire 591. It further has a short arm 581 which is arranged so as to extent from the tensioning arm 582 at an angle of about 90°. At the free end of the short arm 581 a tension spring 588 is attached which is supported by a support bolt 535 mounted on the plate 531. By the tension spring 588, the pull wire 591 is always kept tensioned, although with a relatively small force. Near one end of the short arm 581, a switch 507 is arranged for controlling the energization of the pull wire 591. To the left thereof there is another switch 509 (FIG. 25) for discontinuing the energization of the pull wire 591. The switch 509 is arranged so that its contact is behind the support arm 58 of the carriage 50.

When now the drawer 21 is to be opened, the stepping magnet 541 is actuated by contact with the rear wall 22 of the drawer whereby the switch 8 energized the stepping magnet for example via a circuit. The engagement bolt 542 then slides off the engagement projection 55 of the carriage 50, see FIG. 25. The carriage 50 is released thereby and is moved to the left by the force of the spiral tension spring 261 thereby pivoting the opening lever 70 in clockwise direction against the rear drawer wall 22, see FIG. 5.

With the displacement of the carriage 50, the de-energized and cold pull wire 591 is tensioned whereby the tensioning arm 580 is pivoted by the tensioning roller 589 in a clockwise direction. When the pull wire is fully tightened, the short switch arm 581 contacts the switch 507 which causes energization of the pull wire 591 for example via a circuitry. The pull wire 591 is shortened thereby and generates a pulling force for tensioning the spiral tension spring 561. The tensioning process is completed when the engagement bolt 542 engages again the engagement projection 55, see FIG. 24, and the support arm 58 has actuated the switch 509. The switch 509 causes de-energization of the pull wire 591 whereby the pull wire 591 becomes again longer and the tensioning lever 580 can again pivot back into the position as shown in FIG. 24.

After closing the drawer 21, the drawer opening process can again be initiated.

Figure 26:
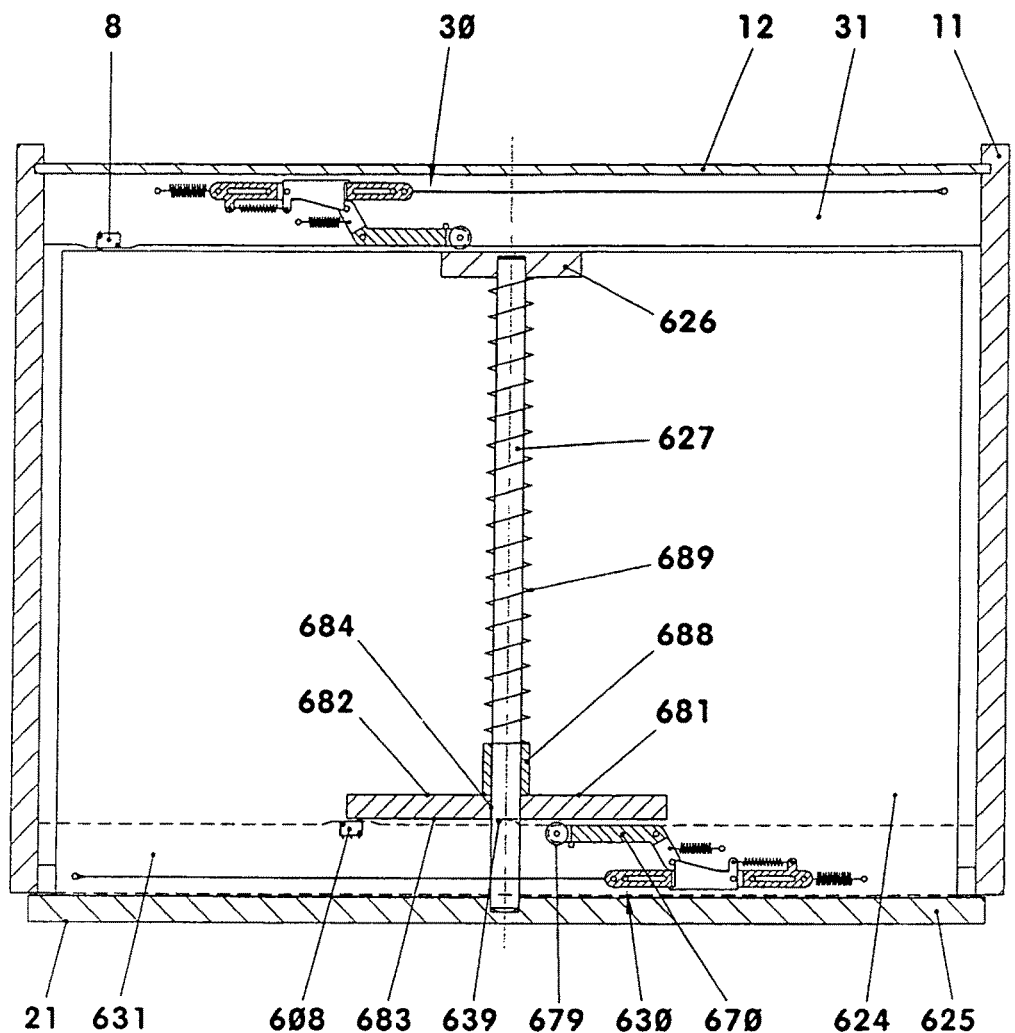
FIG. 26 shows the drawer closed with an operating mechanism for opening and one for closing the drawer.
Figure 27:
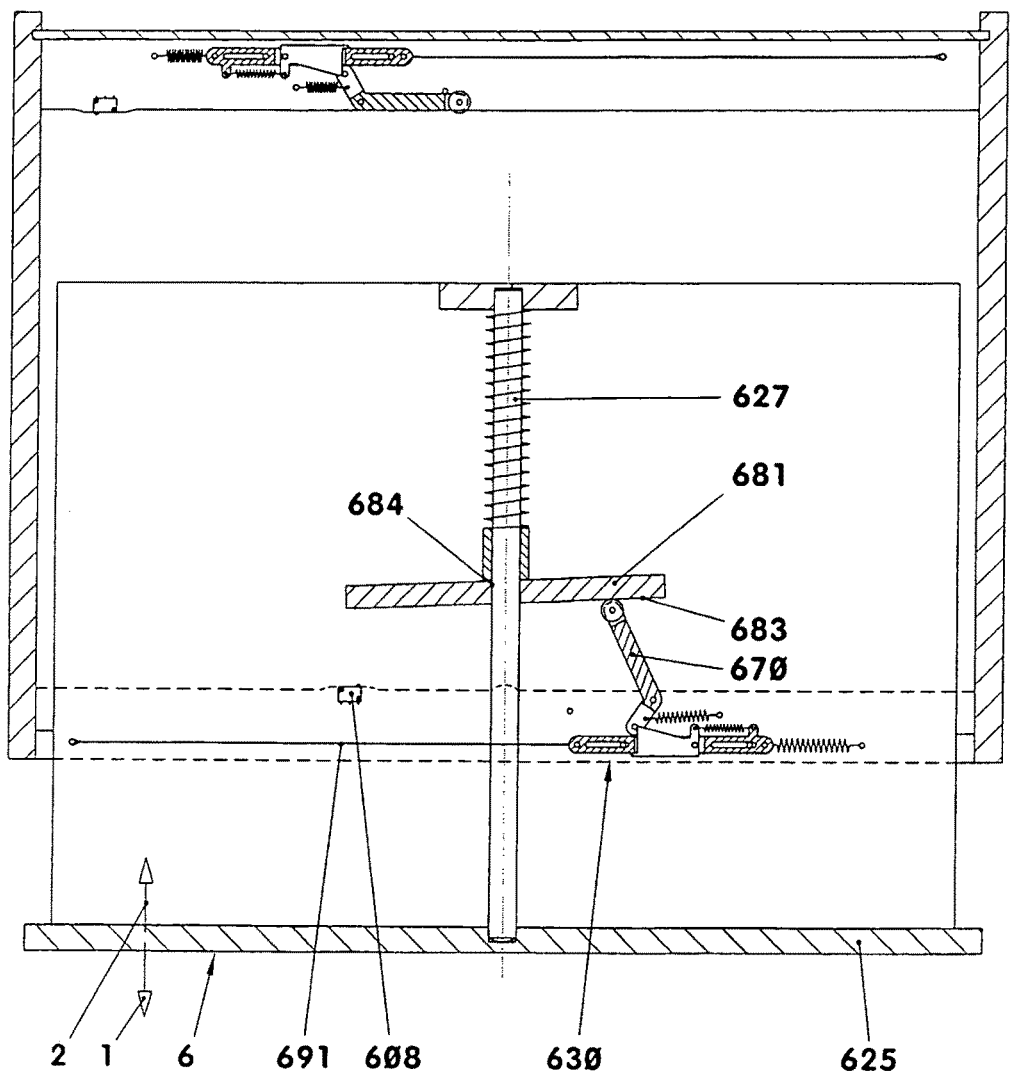
FIG. 27 shows a drawer in the process of being closed.

FIGS. 26 and 27 show each a bottom view of a drawer 21 guided in a cabinet base 11. The drawer 21 is opened by a drive arrangement 30 and is closed by a second drive arrangement 630.

The first drive arrangement 30 is disposed in the area behind the drawer. In front of the rear wall 12 of the cabinet base a plate 31 or a frame is mounted which for example at its bottom side carries a drive structure 30 as it is known from FIGS. 4 to 8.

The second drive arrangement 630 which is of a design that is at least similar and has the same drive arrangement 30 is mounted below the drawer 21 for example on a flat transverse structure 631 so that the drive components are arranged protected between the transverse structure 631 and the drawer bottom 624.

For this drive arrangement 630, a positioning rod 627 is arranged at the bottom side of the drawer bottom 624. This is a smooth cylindrical rod which is accommodated at the front end in a dead end bore of the front panel 625 and, at the rear end, in a dead end bore of a support member 626. The positioning rod 627 extends in the opening direction 1 of the drawer 21. In the longitudinal direction, it is installed in the dead end bores without play.

On the positioning rod 627, a clamping whip 681 is supported. The clamping whip 681 is manufactured for example a bar that is manufactured from an aluminum alloy and has a rectangular cross-section. In the center thereof, it has a bore 684 whose inner diameter is for example 0.3 to 0.6 mm larger than the outer diameter of the positioning rod 627. The upper side of the clamping whip 681 is disposed adjacent the bottom side of the smooth rigid drawer bottom 624 with much play but non-rotatably.

Between the support member 626 and the clamping whip 681 a follower spring 689 and a slide-sleeve 688 are arranged. The slide sleeve 688 abuts at its front end the backside of the clamping whip 681. Behind the slide sleeve 688 is the follower spring 689 which is supported by the support member 626. As shown in FIG. 626, in the closed position of the drawer 21 the clamping whip 681 abuts for example a spherically curved stop element 689. The clamping whip 681 extends at least approximately parallel to the front plate 625.

If the drawer 21 has been opened, a certain distance partially or fully, the stop element 639 of the transverse structure 631 has displaced the clamping whip 681 relative to the drawer by the length of the opening distance. The clamping whip 681 extends still parallel to the front panel 625.

When the drawer 21 is to be closed again a switch arranged on the cabinet 11 or the drawer 21 as actuated which energizes the pull wire 691 of the front drive arrangement 630. As a result, the opening lever 670 is moved into contact with the clamping whip 681 that is the front side 683 thereof. As a result, the clamping vise 681 is tilted by a few degrees in its bore 684 so that it becomes engaged with the positioning rod 627. As a result, the pivot movement of the opening lever 670, see also FIG. 468 plus description, is transmitted by way of the positioning rod 627 to the drawer 21 so that the drawer is moved in closing direction 2. The closing movement is supported by the spring force of the follower spring 689.

As the opening lever 670 is returned again to its start out position, see FIG. 26, the clamping whip 681 extends again parallel to the front panel 625 and slides toward the stop element 639 of the transverse structure 831.

Alternatively, the closing of the drawer may also be initiated by a short opening pull on the drawer. To this end, in front of the left end of the clamping whip 681 the switch actuator of an electrical switch 608 mounted on the transverse structure 631 is positioned without contacting the switch. As a result of the short opening pressure, the clamping whip 681 which abuts the contact roller 679 of the opening lever 670, hits the switch 608 actuator so that the switch causes energization of the pull wire 691 which initiates the closing movement of the drawer.

In the open position, the drawer abuts a resilient stop which is not shown—which permits pulling the drawer 21 out a few millimeters for actuating the switch 608.

For, opening the drawer 21, the switch 8 may also be replaced by an operating element which is arranged somewhere on the cabinet body 11, the drawer 21 or any other suitable place. Also, a wireless actuating element may be used.

| | |
|---|---|
| 1 | Opening direction |
| 2 | Closing direction |
| 5 | Closed position |
| 6 | Open position |
| 8 | Switch |
| 10 | Cabinet base |
| 11 | Cabinet body |
| 12 | Back panel |
| 13 | Side wall |
| 15 | Support frame structure |
| 21 | Drawer |
| 22 | Backwall of drawer |
| 23 | Side wall |
| 24 | Engagement pin |
| 25 | Support roller |
| 26 | Guide track |

-continued

| | |
|---|---|
| 27 | Depression |
| 28 | Projection |
| 29 | Release projection |
| 30 | Drive arrangement |
| 31 | Plate |
| 32 | Support bolt |
| 33 | Support bolt |
| 34 | Support bolt |
| 35 | Support bolt |
| 37, 38 | Guide bolts |
| 39 | Pivot stud |
| 41 | Guide slot |
| 42 | Guide slot |
| 43 | Magnet |
| 44 | Pawl |
| 45 | Engagement nose |
| 46 | Front edge |
| 47 | Angled arm |
| 48 | Guide pin |
| 49 | Release plate |
| 50 | Carriage |
| 51 | Elongated openings |
| 52, 53 | Bores |
| 54 | cavity |
| 55 | Engagement projection |
| 57 | Pawl pivot bolt |
| 58 | Support arm |
| 61 | Spiral tension spring |
| 70 | Knee lever |
| 71 | Short lever arm |
| 72 | Long lever arm |
| 73 | Engagement bolt |
| 75 | Pivot bearing |
| 78 | Tension spring |
| 79 | Lever roller |
| 91 | Taut wire |
| 93 | Pull wire cascade |
| 94 | Pull wire, shape memory |
| 95 | Pull wire, shape element |
| 96 | Reversing structure |
| 97 | Reversing roller |
| 130 | Drive arrangement |
| 131 | Plate |
| 132 | Stop bolt |
| 133 | Support bolt |
| 147 | Pivot lever |
| 148 | Stop |
| 149 | Tension spring |
| 230 | Drive arrangement |
| 231 | Parallelepiped housing |
| 232 | Guide frame |
| 233 | Recess |
| 234 | Ramp inclination |
| 235 | Opening |
| 236 | Opening |
| 238 | Engagement location |
| 239 | Engagement location |
| 248 | Engagement structure |
| 249 | Tension spring |
| 250 | Carriage |
| 251 | S-shaped web |
| 252 | Tooth rack |
| 253 | Support opening |
| 254 | Elongated guide opening |
| 255 | Engagement flank |
| 256 | Slide pawl |
| 257 | Pawl arm |
| 258 | Control pin |
| 259 | Guide pin |
| 261 | Tension spring |
| 270 | Opening lever |
| 271 | Curved arm |
| 272 | Level |
| 273 | Gear section |
| 275 | Support bearing location |
| 276 | Pivot stub |
| 277 | Control surface |
| 278 | Contact line |
| 279 | Last contact line |

-continued

| | |
|---|---|
| 292 | Pull splice strap |
| 309 | Reed switch |
| 330 | Drive arrangement |
| 331 | Frame |
| 333 | Support bolt |
| 334 | Support bolt |
| 336 | Leaf spring stopper |
| 339 | Pivot bearing |
| 340 | Rope pulley |
| 341 | Stopper plate |
| 342 | Permanent magnet |
| 343 | Stopper |
| 344 | Stopper |
| 345 | Bolt |
| 348 | Mounting |
| 349 | Tension spring |
| 350 | Engagement disc |
| 351 | Directional toothing |
| 352 | Dovetail guide structure |
| 354 | Spring-loaded ball |
| 361 | Spiral tension spring |
| 362 | Return wire |
| 370 | Opening lever |
| 375 | First lever cavity |
| 376 | Second lever cavity |
| 380 | Stepping magnet |
| 381 | Magnet housing |
| 382 | Coil |
| 385 | Core |
| 386 | Plunger |
| 387 | Plunger hammer |
| 389 | Tension spring |
| 403 | Arrow-drawer opening |
| 404 | Arrow-return movement |
| 424 | Drawer bottom |
| 425 | Drawer edge |
| 430 | Drive arrangement |
| 431 | Plate |
| 432 | Retaining bolt |
| 433 | Support bolt |
| 434 | Latch member |
| 435 | Latch bearing |
| 436 | Locking spring |
| 437, 438 | Guide bolts |
| 439 | Pivot shaft |
| 440 | Gear wheel |
| 441 | Gear teeth |
| 445 | Freewheeling structure |
| 450 | Carriage |
| 451 | Elongated opening |
| 452 | Bore |
| 453 | Bore |
| 455 | Gearing |
| 458 | Bracket |
| 461 | Return spring |
| 470 | Rotatable disc |
| 471 | Hub |
| 472 | Contact pin |
| 475 | Directional gear structure |
| 507 | Electric switch |
| 509 | Electric switch |
| 530 | Drive arrangement |
| 531 | Support plate |
| 534 | Support bolt |
| 535 | Support bolt |
| 539 | Pivot bearing |
| 541 | Stepping magnet |
| 542 | Engagement bolt |
| 561 | Spring element |
| 580 | Tensioning lever |
| 581 | Switch arm |
| 582 | Long tensioning arm |
| 584 | Pivot bearing |
| 588 | Tension spring |
| 589 | Tensioning lever roller |
| 591 | Pull wire of shape memory alloy |
| 608 | Electric switch |
| 624 | Drawer bottom |
| 625 | Front panel |

-continued

| | |
|---|---|
| 626 | Support member |
| 627 | Positioning rod |
| 630 | Drive arrangement |
| 631 | Transverse structure |
| 639 | Stop element |
| 670 | Opening lever |
| 679 | Contact roller |
| 681 | Clamping whip |
| 682 | Backside |
| 683 | Front side |
| 684 | Bore |
| 688 | Slide sleeve |
| 689 | Follower spring |
| 691 | Pull wire |

What is claimed is:

1. An operating mechanism comprising
a drive arrangement (30, 130, 230) adapted to be fixed to one of a moveable furniture part (21) and a stationary furniture part (11),
the drive arrangement including:
a drive element in the form of a shape memory element (91, 94, 95) which is heatable to be shortened, and
a spring storage device (61, 261) in the form of a tension spring, as well as
a linearly movable carriage (50, 150, 250) guided by the stationary furniture part (11) to which the drive arrangement (30, 130, 230) is fixed,
wherein the drive element (91, 94, 95) is connected to the furniture part (11, 21) to which the drive arrangement (30, 130, 230) is fixed and is guided by the movable carriage (50, 150, 250) and wherein the spring storage device (61, 261) interconnects the movable carriage (50, 150, 250) and the furniture part (11, 21) to which the drive arrangement (30, 130, 230) is fixed,
so that the drive element
operates directly against the linear stroke force of the spring storage device (61, 261) which counteracts an operating stroke of the shape memory element (91, 94, 95), and charges the spring storage device (61, 261), which is tensioned by the shortening of the shape memory element upon heating thereof, the movable furniture part (21) and the stationary furniture part (11) not being in contact with each other when the drive element is not heated,
the operating mechanism further comprising a coupling element (24, 70, 270) in the form of one of a pin (24) fixed to the furniture part (11, 21) to which the drive arrangement (30) is not fixed and a lever (70, 270) arranged on a pivot bearing (75, 275) which is fixed to the furniture part (11, 21) to which the drive arrangement (130, 230) is fixed and is driveable by the movable carriage (50, 150, 250), so that the movable furniture part (21) and the stationary furniture part (11) are brought into temporarily abutting contact with each other via the coupling element (24, 70, 270) by shortening the shape memory element (91, 94, 95),
whereby the movement of the movable furniture part (21) with respect to the stationary furniture part (11) is initiated, and further shortening of the memory element (91, 94, 95) moves the movable carriage (50, 150, 250) into a position in which the coupling element (24, 70, 270) is decoupleable from the memory element (91, 94, 95), so that the shape memory element (91, 94, 95), upon cooling down, regains its original length without being connected to the coupling element (24, 70, 270).

2. The operating mechanism according to claim 1, wherein the shape memory element (91, 94, 95) is shortened by heating for generating the force to operate the drive arrangement (30, 130, 230) and is again elongated upon cooling down.

3. The operating mechanism according to claim 1, wherein the shape memory element (91, 94, 95, 591, 691) is electrically energized to be heated.

4. The operating mechanism according to claim 1, wherein the shape memory element (91, 94, 95) consists of a wire or a bundle of wires.

5. The operating mechanism according to claim 1, wherein the shape memory element (91, 94, 95) is provided at its ends with electrical connectors or electrical connecting wires.

6. The operating mechanism according to claim 1, wherein all components needed for the movement of the movable furniture part (21) are arranged on one of a support plate and a frame and in a housing (31, 131, 231).

7. The operating mechanism according to claim 1, wherein the coupling element in the form of a lever is an opening lever (70, 270) which is pivotally supported on the stationary furniture part so as to be engageable by a coupling projection (45) for opening the movable furniture part (21).

8. The operating mechanism according to claim 1, wherein the shape memory element (91, 94, 95) consists of a nickel titanium alloy.

9. The operating mechanism according to claim 1, wherein the shape memory element (91, 94, 95) has an intrinsic two way effect.

10. The operating mechanism according to claim 1, wherein the movable furniture part (21) is one of a drawer, a revolving door, a pivotable door, a flap and an extension table.

* * * * *